(12) United States Patent
Darmann

(10) Patent No.: US 8,705,215 B2
(45) Date of Patent: Apr. 22, 2014

(54) HIGH VOLTAGE FAULT CURRENT LIMITER HAVING IMMERSED PHASE COILS

(75) Inventor: Francis Anthony Darmann, New South Wales (AU)

(73) Assignee: Applied Superconductor Pty Ltd, Wollongong (AU)

( * ) Notice: Subject to any disclaimer, the term of this patent is extended or adjusted under 35 U.S.C. 154(b) by 0 days.

(21) Appl. No.: 12/740,239

(22) PCT Filed: Nov. 27, 2008

(86) PCT No.: PCT/AU2008/001754
§ 371 (c)(1),
(2), (4) Date: Apr. 28, 2010

(87) PCT Pub. No.: WO2009/067746
PCT Pub. Date: Jun. 4, 2009

(65) Prior Publication Data
US 2010/0254048 A1    Oct. 7, 2010

Related U.S. Application Data

(60) Provisional application No. 60/990,362, filed on Nov. 27, 2007.

(51) Int. Cl.
*H02H 9/02*    (2006.01)
(52) U.S. Cl.
USPC .......................................................... 361/19
(58) Field of Classification Search
USPC .......................................................... 361/19
See application file for complete search history.

(56) References Cited

U.S. PATENT DOCUMENTS

| | | | | |
|---|---|---|---|---|
| 3,521,207 A | * | 7/1970 | Britton et al. ................. | 335/216 |
| 5,241,447 A | * | 8/1993 | Barber et al. ................. | 361/141 |
| 5,250,508 A | * | 10/1993 | Pham ............................ | 505/211 |
| 5,847,633 A | * | 12/1998 | Keller et al. .................. | 335/216 |
| 5,930,095 A | * | 7/1999 | Joo et al. .......................... | 361/58 |
| 5,965,959 A | * | 10/1999 | Gamble et al. ............... | 307/125 |

(Continued)

FOREIGN PATENT DOCUMENTS

| | | |
|---|---|---|
| EP | 0 704 866 | 4/1996 |
| FR | 2 661 288 | 10/1991 |
| WO | 2005/04299 | 1/2005 |
| WO | 2007/029224 | 3/2007 |

OTHER PUBLICATIONS

Thuries et al., "Towards the Superconducting Fault Current Limiter", IEEE Transactions on Power Delievery, vol. 6, No. 2, Apr. 1991, pp. 801-808.

(Continued)

*Primary Examiner* — Rexford Barnie
*Assistant Examiner* — Ann Hoang
(74) *Attorney, Agent, or Firm* — Fay Kaplun & Marcin, LLP

(57) ABSTRACT

A fault current limiter including: a ferromagnetic circuit formed from a ferromagnetic material and including at least a first limb, and a second limb; a saturation mechanism surrounding a limb for magnetically saturating the ferromagnetic material; a phase coil wound around a second limb; a dielectric fluid surrounding the phase coil; a gaseous atmosphere surrounding the saturation mechanism.

24 Claims, 8 Drawing Sheets

(56) References Cited

U.S. PATENT DOCUMENTS

| | | | |
|---|---|---|---|
| 6,809,910 | B1 | 10/2004 | Yuan et al. |
| 7,193,825 | B2 | 3/2007 | Darmann et al. |
| 2002/0018327 | A1 | 2/2002 | Walker et al. |
| 2006/0044105 | A1* | 3/2006 | Darmann et al. .... 336/DIG. 001 |
| 2006/0158803 | A1 | 7/2006 | Friedman et al. |
| 2007/0023680 | A1 | 2/2007 | Tekletsadik |
| 2007/0115598 | A1 | 5/2007 | Darmann et al. |

OTHER PUBLICATIONS

Xin et al., "Development of Saturated Iron Core HTS Fault Current Limiters", IEEE Transactions on Applied Superconductivity, vol. 17, No. 2, Jun. 2007, pp. 1760-1763.

Ying et al., "Development of Saturated Iron Core HTS Fault Current Limiters" Jun. 1, 2007, vol. 17, No. 2, pp. 1760-1763, XP011188605, ISSN: 1051-8223, DOI: 10.1109/TASC. 2007.898181.

* cited by examiner

HIGH VOLTAGE FAULT CURRENT LIMITER HAVING IMMERSED PHASE COILS

PRIORITY CLAIM

This application is a National Phase Application of the PCT Application Serial No. PCT/AU2008/001754 filed on Nov. 27, 2008 which claims priority to U.S. Provisional Patent Application Ser. No. 60/990,362 filed on Nov. 27, 2007; the specifications of the above-identified applications are s expressly incorporated herein, in their entirety, by reference.

GOVERNMENT RIGHTS

The United States Government has certain rights in the invention pursuant to a contract with the U.S. Department of Energy.

FIELD OF THE INVENTION

The present invention relates to the field of High Voltage Fault Current Limiters and, in particular, discloses a high voltage saturated core fault current limiter.

BACKGROUND OF THE INVENTION

Saturated core fault current limiters (FCLs) are known. Examples of superconducting fault current limiting devices can be seen in: U.S. Pat. No. 7,193,825 to Darmann et al; U.S. Pat. No. 6,809,910 to Yuan et al; U.S. Pat. No. 4,490,769 to Boenig; and US Patent Application Publication Number 2002/0018327 to Walker et al.

The fault current limiters described are normally suitable for use with dry type copper coil arrangements only. Indeed, the described arrangements are probably only suitable for DC saturated FCLs which employ air as the main insulation medium. That is, the main static insulation medium between the AC phase coils in a polyphase FCL and between the AC phase coils and the steel core, DC coil, cryostat, and main structure is provided by a suitable distance in air. This substantially limits the FCL to a "dry type" insulation technologies. Dry type technologies normally refers to those transformer construction techniques which employ electrically insulated copper coils but only normal static air and isolated solid insulation barrier materials as the balance of the insulation medium. In general, air forms the majority of the electrical insulation material between the high voltage side and the grounded components of the device such as the steel frame work and the case.

The utilisation of dry type insulation limits the design to lower voltage ranges of AC line voltages of up to approximately 39 kV. Dry type transformers and reactors are only commercially available up to voltage levels of about 39 kV. As a result, the current demonstrated technology for DC saturated FCLs is not suitable for extension into high voltage versions. Dry type designs result in an inability to design a practically sized compact structure using air as an insulation medium when dealing with higher voltages. One of the main practical markets for FCLs is the medium to high voltage (33 kV to 166 kV) and extra-high voltage range (166 kV to 750 kV). At these voltage ranges, the currently described art and literature descriptions of DC saturated FCC's are perhaps not practical. The main reason is due to static voltage design considerations. For example, breakdown of the air insulation medium between the high voltage copper coils and the cryostat or steel core or DC coil. High voltage phase coils at medium to high voltages (greater than 39 kV) often need to be immersed in a insulating gas (such as SF6, nitrogen), a vacuum (better than $10^{-3}$ mbar) or a liquid such as a synthetic silicone oil, vegetable oil, or other commonly available insulating oils used in medium, high voltage, and extra-high voltage transformer and reactor technology. When a high voltage device is immersed in such an insulating medium, that medium is often referred to as the "bulk insulation medium", or the "dielectric". Typically, the dielectric will have a relative permittivity of the order of about 2-4, except for a vacuum which has a relative to permittivity equal to 1. These so called, dielectric insulation media have electrostatic breakdown strength properties which are far superior to that of atmospheric air if employed judiciously by limiting the maximum distance between solid insulation barriers and optimising the filled dielectric distance with respect to the breakdown properties of the particular liquid or gaseous dielectric.

The commonly available bulk insulating gases and liquids typically have a breakdown strength of the order to 10 to 20 kV/mm but are usually employed such that the average electric field stress does not exceed about 6-10 kV/mm. This safety margin to the breakdown stress value is required because even if the average electrostatic field stress is 6-10 kV/mm, the peak electrostatic field stress along any isostatic electric field line may be 2 to 3 times the average due to various electrostatic field enhancement effects.

In general, there are five in desirable requirements of a dielectric liquid or gas for high voltage bulk insulation requirements in housed plant such as transformers and reactors and fault current limiters:

The dielectric must show a very high resistivity,
The dielectric losses must be very low,
The liquid must be able to accommodate solid insulators without degrading that solid insulation (for example, turn to turn insulation on coil windings or epoxy),
The electrical breakdown strength must be high, and
The medium must be able to remove thermal energy losses.

Solid insulation techniques are not yet commonly available at medium to high voltages (i.e. >39 kV) for housed devices such as transformers, reactors and fault current limiters. The shortcoming of solid insulation techniques is the presence of the inevitable voids within the bulk of the solid insulation or between surfaces of dissimilar materials such as between coil insulation and other solid insulation materials. It is well known that voids in solid insulation with high voltages produce a high electric stress within the void due the field enhancement effect. This causes physical breakdown of the surrounding material due to partial discharges and can eventually lead to tracking and complete device failure.

It will be recognized that a DC saturated fault current limiter which employs a single or multiple DC coils for saturating the steel core, such as those disclosed in the aforementioned prior art, poses fundamental problems when the copper AC phase coils can no longer be of a "dry type" construction or when the main insulation medium of the complete device is air. A significant problem in such arrangements is the presence of the steel cryostat for cooling the DC HTS coil and the DC HTS coil itself. The cryostat and the coil and the steel cores are essentially at ground potential with respect to the AC phase coils.

As a side issue, but one which enhances the insulation requirements for all high voltage plant and equipment, it is normally the case that basic insulation design must also meet certain electrical engineering standards which test for tolerance to various types of over-voltages and lighting impulses over predetermined time periods. An example, in Australia, of such standards are as follows:

AS2374 Part 3. Insulation levels and dielectric tests which includes the power frequency (PF) and lightning impulse (LI) tests of the complete transformer.

AS2374 Part 3.1. Insulation levels and dielectric tests—External clearances in air AS2374 Part 5. Ability to withstand short-circuit These standards do not form an exhaustive list of the standards that high voltage electric equipment must meet. It is recognised that each country has their own standards which cover these same design areas and reference to an individual country's standard does not necessarily exclude any other country's standards. Ideally a device is constructed to meet multiple countries standards.

Adherence to these standards result in a BIL (Basic Insulation level) for the device or a "DIL" (Design Insulation Level) which is usually a multiple of the basic AC line voltage. For example, a 66 kV medium voltage transformer or other housed device such as a FCL may have a BIL of 220 kV. The requirement to meet this standard results in a static voltage design which is more strenuous to meet practically than from a consideration of the AC line voltage only. The applicable standards and this requirement has resulted from the fact that a practical electrical installation experiences temporary over voltages which plant and devices may experience within a complex network, for example lightning over voltages, and switching surges. Hence, all equipment on an electrical network has a BIL or DIL appropriate for the expected worst case transient voltages.

An initial consideration of the static design problem for high voltage DC saturated fault current limiters may result in the conclusion that the problem is easily solved by housing only the high voltage AC copper coils in a suitable electrical insulating gas or liquid. However, the problem with this technique is that the steel core must pass through the container which holds the gas or liquid. Designing this interface for long term service is difficult to solve mechanically. However, more importantly solving the interface problem electrostatically is much more complex and any solution can be prone to failure or prove uneconomical. The problem is that as a seal must be developed between the vessel containing the dielectric fluid and the high magnetic permeability core.

Another possibility is the use of dry solid high voltage barriers between phases and between phases and the steel core and cryostat or a layer of high voltage insulation around the copper phase coils and in intimate contact with the phase coils without the combined use of a dielectric liquid or gas. However, not including liquid or gaseous dielectric has a significant deleterious side effect. It is known that the static electric field in a combination of air and other materials with a higher relative permittivity is that this always results in an enhanced electric field in the material or fluid with the lower permittivity (that is air). For example, consider a conductive copper cylinder with a layer of normal insulation to represent the turn to turn insulation, according equation 1.

$$E_x = \frac{U_m}{x \cdot \left\{ \frac{\ln\left[\frac{R}{r}\right]}{\varepsilon_2/\varepsilon_1} + \frac{\ln\left[\frac{d}{R}\right]}{1} \right\}} \quad \text{Eq. 1}$$

where:
$U_m$=AC phase voltage with respect to ground
R=radius of a copper cylinder including outside insulation [mm]
r=radius of bare copper cylinder [mm]
d=distance from centre of cylinder to the nearest ground plane [mm]
$\varepsilon_2$=relative dielectric constant of the insulation covering the cylinder
$\varepsilon_1$=relative dielectric constant of the bulk insulation where the cylinder is immersed (=1 for air)
x=distance from the centre of cylinder to a point outside the cylinder [mm]
$E_x$=Electrostatic field gradient at point x [kV/mm]

The field enhancement effect is represented by the factor $\varepsilon_2/\varepsilon_1$ and is of the order 2 to 4 for common everyday materials except for the case of employing a vacuum which has a relative permittivity equal to 1. Hence, by providing additional solid or other insulation material (of higher electric permittivity than air), one increases the electrostatic stress in the bulk air insulation of the FCL. The better the quality of the high voltage insulation, the higher the field enhancement effect.

Hence, by only using solid dielectric insulation barriers, without immersion in a dielectric liquid or gas, in an otherwise air insulated FCL is not a technically desirable option for high voltage FCL's at greater than 39 kV and indeed one does not see this technique being employed to make high voltage dry type transformers at greater than 39 kV for example. In fact, no techniques have been found highly suitable to date and that is why high voltage transformers above 39 kV are insulated with a dielectric liquid or gas.

The discussion above is the reason why housed high voltage electrical equipment is often completely immersed in electrically insulating dielectric fluid or gas. That is, the insulated copper coils and the steel core of transformers and reactors are housed within a container that is then completely filled with a dielectric medium which is a fluid. This substantially reduces the electrostatic voltage design problems detailed in the above discussion. The insulating medium (for example oil, vacuum, or SF6) fills all of the voids and bulk distances between the high voltage components and the components which are essentially at ground or neutral potential. In this case, solid insulation barriers may be incorporated into the bulk insulating dielectric and for many liquids such as oil, dividing the large distances with solid insulation improves the quality of the overall electrostatic insulation by increasing the breakdown field strength of the dielectric fluid. This is because the relative permittivity of the oil and solid insulation are very close to each other (so field enhancement effects are lessened compared to air) and the breakdown voltage of the bulk dielectric medium (expressed in kV/mm) improves for smaller distances between the insulation barriers.

However, the problem with the full immersion technique is that it is not readily adaptable to a DC saturated FCL designs or other devices that incorporated a superconductor coil as the DC saturating element. This is because the superconducting coil and its cryostat or vacuum vessel are a component of the FCL which must also necessarily be immersed in the dielectric fluid.

Any discussion of the prior art throughout the specification should in no way be considered as an admission that such prior art is widely known or forms part of common general knowledge in the field.

SUMMARY OF THE INVENTION

It is an object of the present invention to provide for an improved construction of a High Voltage Fault Current Limiter.

In accordance with a first aspect of the present invention, there is provided a fault current limiter including: a ferromagnetic circuit formed from a ferromagnetic material and including at least a first limb, and a second limb; a saturation mechanism surrounding a first limb for magnetically saturating the ferromagnetic material; a phase coil wound around a second limb; a dielectric fluid surrounding the phase coil; and a gaseous atmosphere surrounding the saturation mechanism.

In some embodiments, the saturation mechanism can comprise a cooled superconducting coil interconnected to a DC power supply. The superconducting coil can be within a cryostat.

The limiter can also include an external vessel for housing the limiter components; a series of terminals mounted on the external vessel and wherein the phase coil preferably can include an AC input and an AC output lead interconnected to predetermined ones of the terminals The limiter can also include a low temperature cooling supply hose interconnected to the saturation mechanism.

The limiter can be utilised in a multiphase power supply to limit each phase of the supply. In some embodiments, a single saturation mechanism surrounds the ferromagnetic circuit of each phase of the multiphase power supply. The saturation mechanism and the phase coil are preferably formed around the same elongated portion of ferroelectric material. The saturation mechanism can be formed around a proximal end of the elongated portion and the phase coil can be formed around the distal end of the elongated portion. The ferromagnetic circuit can comprise a single elongated portion of ferroelectric material.

In some embodiments, the ferromagnetic circuit preferably can include a first, second and third limbs parallel to one another, with portions of the phase coil wound around a first and second limb, with the saturation mechanism wound around a third limb.

In accordance with a further aspect of the present invention, there is provided a fault current limiter including: a ferromagnetic circuit formed from a ferromagnetic material and including at least a first limb, a second limb; third limb; fourth limb; a saturation mechanism surrounding the limb for magnetically saturating the ferromagnetic material; a first phase coil wound around the second limb; a second phase coil wrapped around the third limb and a third phase coil wrapped around the fourth limb; and a dielectric fluid surrounding the phase coils, and a gaseous atmosphere surrounding the saturation mechanism. The saturation mechanism can comprise a superconducting coil wound around the first limb within a cryostat.

In accordance with a further aspect of the present invention, there is provided a fault current limiter including: a ferromagnetic circuit formed from a ferromagnetic material and including at least a first limb, and a second limb; a saturation mechanism surrounding a first limb for magnetically saturating the ferromagnetic material during non fault conditions; at least one phase coil wound around a second limb; and a dielectric fluid surrounding the phase coil. In some embodiments, the first and second limb are preferably adjacent one another and the saturation mechanism and the phase coil are preferably of substantially the same size or extent.

BRIEF DESCRIPTION OF THE DRAWINGS

Preferred embodiments of the invention will now be described, by way of example only, with reference to the accompanying drawings in which.

DESCRIPTION OF PREFERRED AND OTHER EMBODIMENTS

In the preferred embodiments there is provided a high voltage, DC-saturated FCL which does not suffer substantially from the bulk insulation problems discussed above. The AC phase coils are connected to a high voltage AC source. The DC coil is a relatively low voltage coil energised by a DC source and utilised to saturate the core.

Figure 1:
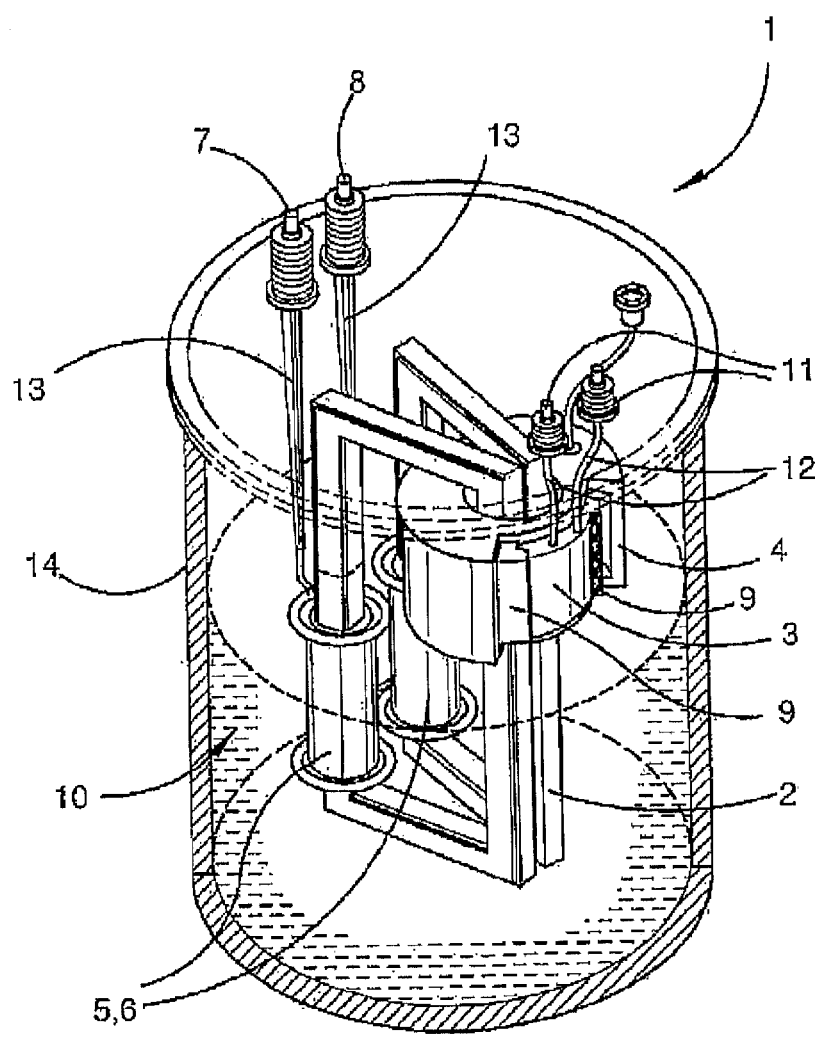
FIG. 1 illustrates a side perspective view of a single phase high voltage DC saturated fault current limiter of a first embodiment.

Turning initially to FIG. 1, there is illustrated a side perspective cut away sectional view through a first single phase high voltage fault current limiter 1. The limiter is designed to operate substantially in accordance with the operational teachings of U.S. Pat. No. 7,193,825 to Darmann et al, the contents of which are hereby incorporated by cross-reference, with extensions to high voltage operation. The limiter 1 includes two steel square core loops e.g. 2 having an upper section around which a superconducting coil 3 is wound. The coil 3 is placed in a cryostat for cooling and acts to magnetically saturate the core loop 2 during normal operation.

Around each of the cores is wound an AC phase coils 5, 6. The coils are interconnected via a conductor having a solid insulation e.g. 13 to high voltage bushings and terminals e.g. 7, 8. The lower portion of the core is immersed in a dielectric fluid or gas 10.

The superconducting coil 3 is fed by current leads 12 which are interconnected to bushings e.g. 11 for external power supply.

In the preferred embodiments, the AC phase coils 5,6 are wound in the opposite sense and directly connected in series.

The DC saturating current carrying coil 3 acts as the saturating mechanism for the high permeability core e.g. 2 and surrounds the limbs of the core. In a preferred embodiment, the current carrying coil 3 is a superconducting coil which can be surrounded by a multi layer thermal insulation 9 and placed in a vacuum vessel cryostat 4. The required vacuum level in the cryostat is that suitable for effective thermal insulation only, not for electrostatic insulation. The vacuum vessel cryostat 4 may be manufactured from stainless steel, plastic, glass fibre reinforced plastic or any other suitable material for holding a vacuum.

A coil pair 5, 6 is required for each phase in order to effectively limit the fault current on both half cycles of the fault current waveform.

The basic theory of DC saturated fault current limiters as set out in U.S. Pat. No. 7,193,825 to Darmann et al still apply. That is, the entire steel core is saturated to a level of magnetic field such that the terminal impedance of the each phase at the AC phase bushings is minimised. For example, for a steel laminated core employing M6 laminations, the level of saturation may be 2.05 Tesla. At this level of saturation the relative permeability of the steel core is approximately 1.6. The phase terminal impedance of the FCL is given by equation 2 below:

$$X = [2\pi f \cdot n^2 A/L] \mu_r \cdot \mu_o \text{ [units=}\Omega\text{]} \qquad \text{Equation 2}$$

Where:
X is the AC steady state terminal impedance of the FCL as seen by the network when there is no fault current event,
f is the frequency
n is the number of ac turns on each of the phase windings
A is the cross sectional area of the high permeability core
L is the effective magnetic length of the high permeability core per phase
$\mu_o$ is the permittivity of free space
$\mu_r$ is the relative permittivity of the high permeability core in the saturated state By employing the design depicted in FIG. 1, the footprint of the device is minimised for any given AC phase voltage. This is important in substations located close to city centres. A significant market for FCLs is as retrofits to existing substations and other installations. Often, only a minimal amount of footprint space is available between the existing transformer bays.

Figure 2:
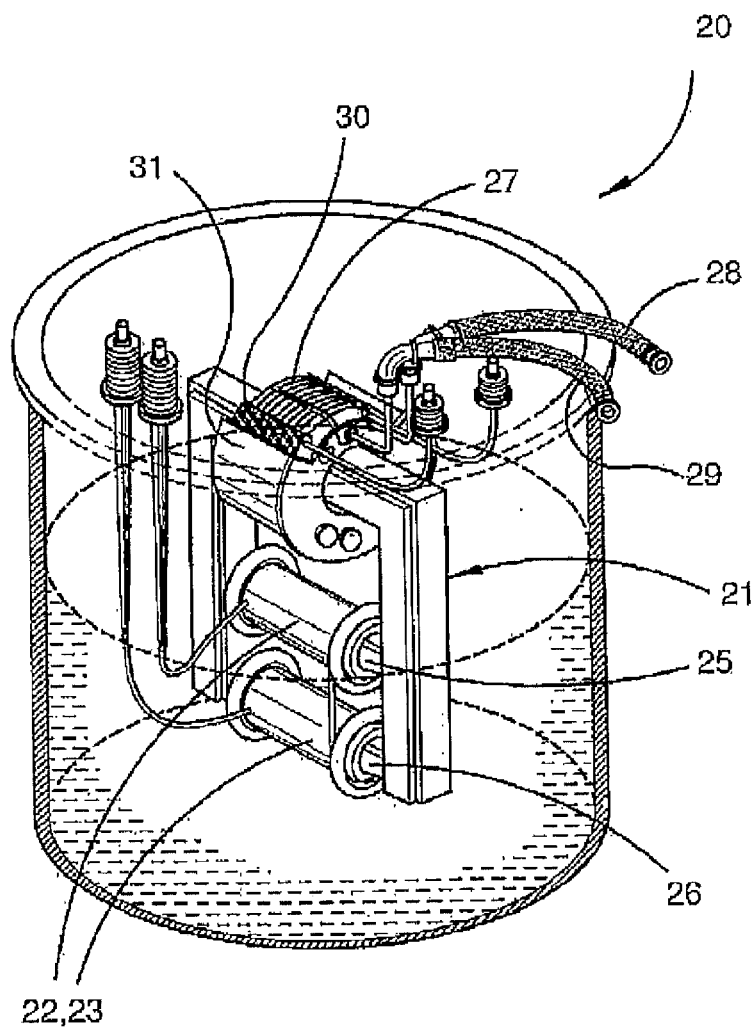
FIG. 2 illustrates a side perspective view of a single phase high voltage DC saturated fault current limiter of a second embodiment.

Turning now to FIG. 2, there is illustrated an alternative embodiment 20 of a single phase current limiter. In this modified arrangement 20, the two high voltage AC phase coils 22, 23 are mounted on limbs 25, 26 which are further integrally interconnected to the steel core 21. The steel corn 21 further includes a limb passing thorough a horizontally mounted superconducting coil 27, having a multi layer thermal insulation 30 and a surrounding single wall cryostat 31. The cryostat is fed with helium gas via hoses 28, 29.

The design 20 is particularly advantageous for providing a reduced footprint because the two phase coils e.g. 22, 23 are located on similar high permeability core yokes connected to the steel core 21. Another advantage of the arrangement 1 is the physical separation of the low voltage superconducting bias winding 27 from the high voltage ac phase coils 22, 13. This simplifies the electrostatic design for the high voltage engineer.

Advantageously, conventional art and techniques applied to high voltage winding coils may be employed to manufacture the conventional phase coils. Indeed, the phase coils may be paper insulated copper coils and the dielectric may be synthetic silicon oil making the bottom portion of the FCL essentially like a conventional reactor or open circuited transformer.

Another advantage of the arrangements of FIG. 1 and FIG. 2 is that the cryostat and feedthrough elements (for current, cryogen, sensors, vacuum ports) do not have to be immersed in a liquid dielectric and are accessible from the top of the complete vessel. This makes the arrangement more practical for utility application where general repairs, replacements, and modifications may have to be made to the cryostat.

In addition, there is nothing inherent in the arrangements which restrict or guide the aspect ratio of the complete device to any particular configuration. The foot print is augmentable to be larger in any design if the space is available, and the height of the FCL may be made as short as required to clear overhead incoming high voltage lines if required.

Ideally, in the arrangement of FIG. 2, the lower limbs 25, 26 have a reduced cross sectional area. This is to ensure adequate saturation of the entire core including all of the limbs on which the phase coils reside.

In a preferred embodiments, the DC saturating coil is a superconducting winding. The cooling of the DC superconducting coils may be achieved either by forced cryogenic gas (for example Helium gas at 20 Kelvin or Neon gas at 30K) or another suitable cooling gas with suitable heat capacity. The cooling gas, in turn, may be cooled by a heat exchanger in a cryocooler which employs Helium gas as the refrigerant or working fluid. The heat exchanger/cryocooler may be located externally to the fault current limiter, up to 5 meters away for example, and at a distance which is commensurate with the voltage of the AC bushings. By locating the cryocooler/heat exchanger remotely, scheduled maintenance procedures, repair work, checking, and replacements may be carried out while the FCL is in service.

In addition, by using separate and redundant cryocoolers/heat exchangers to cool the superconductor coil cooling fluid, an inherent built in robustness may be achieved which is both necessary and attractive for practical utilisation of fault current limiters at sub-stations and other critical electricity supply infrastructure.

In an alternative embodiment, the required degree of cooling robustness and the high level of reliability can be achieved with a liquid cryogen such as liquid Nitrogen, liquid Neon, or liquid Helium. In order to practically integrate a liquid cooled superconducting coil into the FCL design the cryostat is most practically a doubled wailed cryostat. This is to ease the design of the electrical feedthroughs from the atmospheric environment into the cryogenic environment. Due to the low voltage/low current of these electrical feedthroughs, they are available off the shelf from several distributors such as Ceramaseal, Kurt J Lesker, Leybold, and ISI.

One advantage of utilising a liquid cryogen in the preferred embodiment in a utility situation is that the device becomes less sensitive to mechanical breakdowns, the cooling can be stored in a separate storage vessel, and an inherent buffer within the cryostat itself may be designed.

Not shown in FIG. 1 for clarity are the cylindrically shaped or other desired shapes of the electrostatic phase barriers between the steel core and the AC phase coils, the AC phase coils of different phases, and between all phase coils and the containment vessel which is essentially at earth potential. The design and incorporation of these elements is well know to the skilled high voltage transformer designer. It will be recognised that the integration of this cryostat into the steel core structure proposed is a straight forward matter and the judicious use of high voltage phase barriers in combination with the dielectric fluid makes this a practically realisable design for a high voltage FCL.

In extra high voltage designs, the phase coils can be at even greater distance from each other in order to facilitate the practical electrostatic design. In such arrangements, the steel phase cores and coils can be separated by a greater distance to allow the high voltage design engineer to fit in additional electrostatic insulation phase barriers were required. This allows the dielectric insulation liquid or gas to be finely divided into even further channels. This provides considerable scope to optimise the design for the electric stress and the electrical break down stress for the particular dielectric fluid employed.

In all of the design variations considered here, if the DC saturating element fails in any way, then it will be recognised to one experienced in the art that the fault current limiter essentially behaves as a steel core reactor and if designed judiciously, does not require the FCL structure to be taken out of service. Possible failure mechanisms include the power supply, the superconducting coil, the cryocoolers, and the vacuum vessel.

Now it will be well known to those experienced in the art of high voltage design that the interface between the dielectric fluid and the normal atmosphere is a region of high electrical stress and is subject to an electric field enhancement effect. The enhancement is proportional to the ratio of the dielectric permittivity of the dielectric fluid and the air. The overall arrangement of the high voltage and extra high voltage FCL described here allows considerable scope for the high voltage design engineer to design suitable electrostatic barriers and shaped creep stress insulators to cope with this effect. In addition, the distance between the cryostat (which is at earth potential) and the surface of the dielectric fluid may be made as large as required to cope with the expected electric field stress.

Of course, as is well known in the prior art, employment of well designed solid type electric stress insulation barriers may also be employed between the under surface of the cryostat (ground potential) and the surface of the dielectric. Such barriers must be designed so that the creep voltage and maximum stress is within the tolerances of the material chosen.

In addition, as is customarily employed on conventional high voltage transformers, the space between the liquid dielectric and the top of the complete enclosing vessel may also be filled with a dry inert gas. Typically, gaseous nitrogen is employed for high voltage transformers, for example, between the top of the liquid dielectric (e.g. Synthetic oil) and the top lid of the containment vessel. This confers an advantage for the electrostatic design. The intelligent routing of the phase coil conductors is a further design consideration for the high voltage engineer. The phase conductors and bushings for each pair of coils may be placed in relative proximity to each other because they are at essentially the same voltage potential. The distance between each pair of phase conductors, and the electrostatic insulation barriers must however be designed to be compatible with the dielectric fluid employed.

It will also be noticed that unlike in a high voltage transformer, the vessel side of the high voltage bushings will need suitable electric stress barriers surrounding the high voltage conductor all the way down to the dielectric fluid.

A further advantage of described arrangements is that the top portion of the high voltage phase bushings employed in this design may be standard high voltage bushings without any customisation or requirement for vacuum feedthroughs or cryogenic feedthroughs. The only customisation required is the extension of the dielectric side of the electric conductor's electric stress barrier. This extension may be a ceramic or other suitable material. The electric stress barrier can extend into the dielectric fluid and hence the material chosen must be compatible with that fluid in such cases but this is by no means essential.

As is well known, sharp corners should be to be avoided in all high voltage equipment such as that presented in the art described here. Hence, the phase conductors must be manufactured of a conductor which as a radius appropriate for the design voltage (i.e. the BIL), the dielectric fluid employed, and the particular geometric arrangement of phase coils and cryostats chosen. In addition, the cryostat shell, if manufactured form stainless steel or other similar electrically conductive material, should be manufactured with rounded corners of a minimum radius appropriate for the phase voltage, BIL, and distances under consideration.

If the cryostat is manufactured from GFRP, plastic, or other materials which are substantially non-electrically conductive, then the electrostatic field distribution should be arranged and designed such that the creep voltage across the surface of the cryostat is within the design tolerance for the insulation/dielectric interface.

If the cryostat is manufactured using a hybrid technology—for example an outer stainless steel shell and an inner GFRP or other non-electrically conductive material for the inner shell, then the electrostatic field design must be such that due consideration is paid to all appropriate electrostatic effects including but not limited to the following: The appropriate dielectric clearances between high voltage conductors and the electrically conductive portions of the cryostat; The elimination of sharp corners on the metallic portions of the cryostat; The appropriate arrangement of solid insulation materials such the creep voltage across the electrically insulating portions of the cryostat is appropriate for the dielectric and the insulation materials employed.

The arrangements disclosed provide for a high voltage FCL that allows a high voltage design engineer the scope to employ the prior art in high voltage engineering to manufacture a high voltage FCL of the DC saturated type. The design presented here is advantageous because existing high voltage design techniques may be directly employed to realise a high voltage FCL design with a DC saturating winding. A design can readily employ off the shelf components to manufacture a high voltage FCL.

It will also be apparent that the present arrangements can be extended to lower voltage systems where required. Further, the preferred embodiment can be extended to multi-phase arrangements as will now be described.

Figure 3:
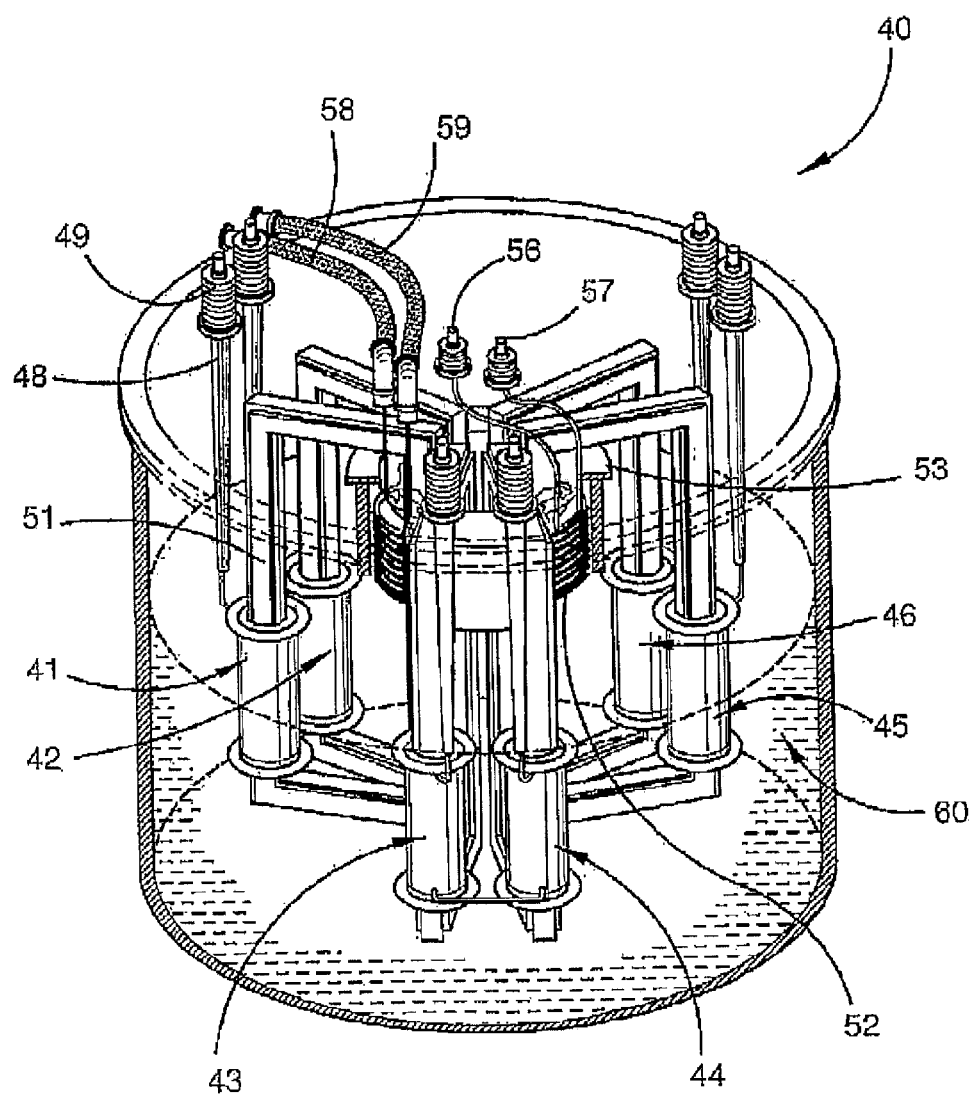
FIG. 3 illustrates a side perspective view of a first three phase high voltage DC saturated fault current limiter.

FIG. 3 illustrates a side perspective view of one form of multiphase arrangement that may be utilised in practice. In this arrangement 40, six phase coils are provided 41-46, with an input and output phase coil being provided for each phase. Each phase coil is interconnected via a high voltage AC conductor line e.g. 48 to a corresponding high voltage bushing and terminal e.g. 49. Each phase coil is wrapped around a corresponding core e.g. 51. A DC biasing coil 52 is formed within cryostat 53. The coil 52 is fed by terminals 56, 57 and a liquid nitrogen supply is fed to the cryostat via hoses 58, 59.

The phase coils 41-46 are held in the dielectric fluid medium 60 while the cryostat is held above the dielectric fluid medium 60.

Figure 4:
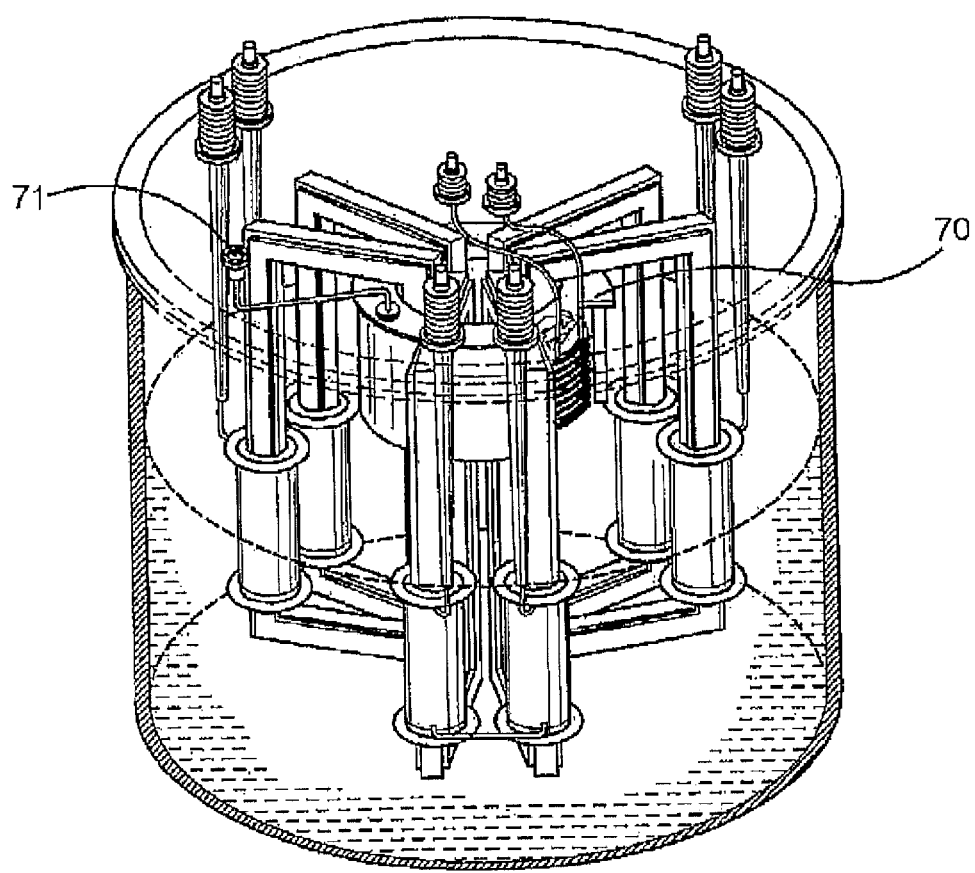
FIG. 4 illustrates a side perspective view of a further three phase high voltage DC saturated fault current limiter having a coolant fill port.

FIG. 4 illustrates an arrangement similar to that provided in FIG. 3, however, in this arrangement, the cryostat 70 is filled via a coolant fill port 71 rather than via the coolant gas hoses as shown in the arrangement of FIG. 4.

Figure 5:
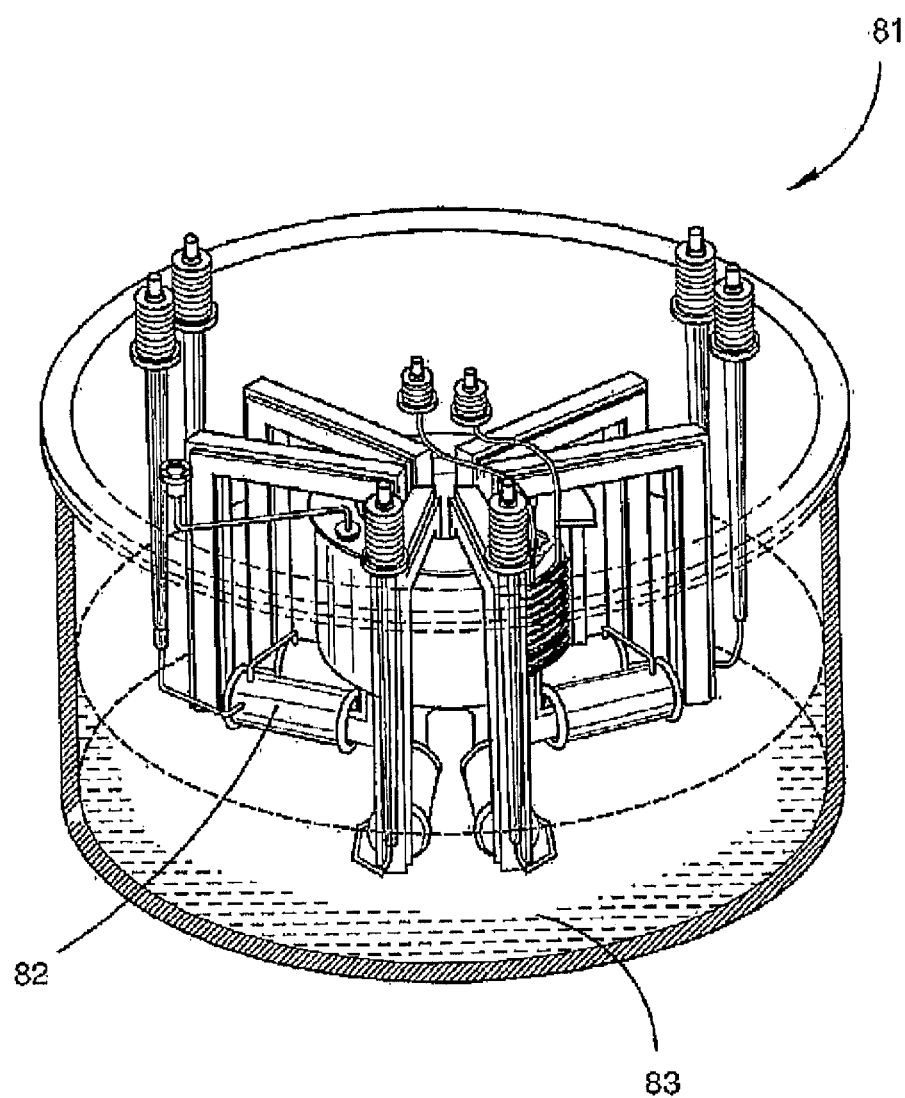
FIG. 5 illustrates a side perspective view of a three phase high voltage DC saturated fault current limiter having horizontal coils.

Turning now to FIG. 5, there is shown a further modified embodiment 81 wherein the phase coils e.g. 82 are placed around the lower limbs of the core. This arrangement has the advantage that potentially less dielectric fluid 83 is required to fill cover the AC coils completely and therefore a more compact arrangement is achieved.

Of course, it will be recognised by those skilled in the art that the specifics of the electrostatic design of this arrangement may differ from that for previous arrangements described here.

Further modifications embodiments are possible. An example modified embodiment will now be described with reference to FIG. 6. This embodiment 90 has been directed to minimizing the flux density loss through a high permeability structure. These losses are normally due to two main effects:

1. The fringing of the magnetic field around the DC bias coil 91 and returning through a purely air path;

2. Partial air/core flux return where the flux enters the top yokes but returns via an air path instead of a complete high permeability path.

By way of preliminary investigation, FEA analysis was conducted on the following structure: Window dimension width=450 mm, Window dimension height=650 mm, Material: M6 laminated steel core, Laminations employed to construct core: 0.35 mm step lapped core structure, Final cross sectional area of core: 100 mm×100 mm, Total core height=850 mm, Total core width=650 mm.

With such a simulated structure, it was found that there was a loss of magnetic flux density in the far limbs and yokes as follows: Inner limb magnetic flux density=2.35 Tesla, Yoke magnetic flux density=1.97 Tesla, Outer limb magnetic flux density=1.95 Tesla.

Figure 6:
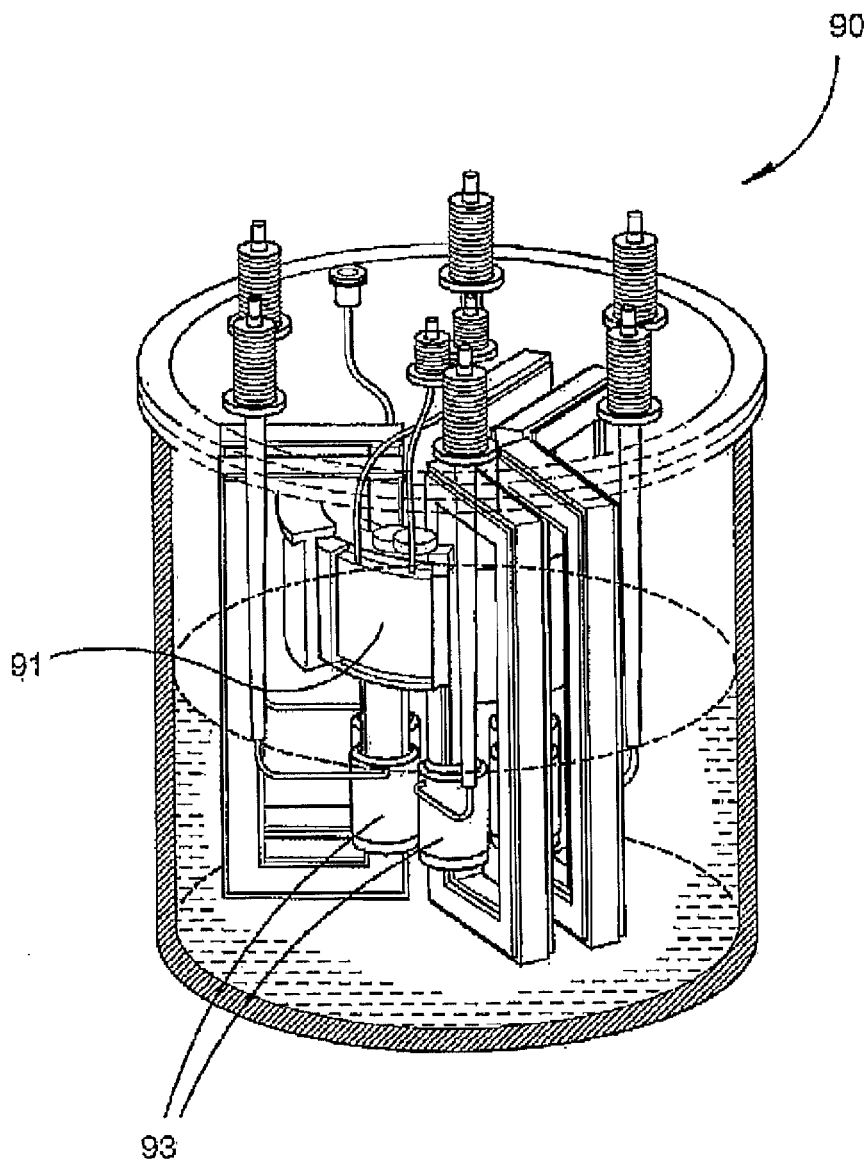
FIG. 6 illustrates a side perspective view of a further modified embodiment having the phase coils closely adjacent the superconducting coil.

One way to overcome this effect is to provide additional ampere turns so that the biasing of the outer limb portion to a satisfactory level for FCL operation (e.g. 1.95 Tesla). However, as an alternative to this approach (i.e. employing more bias ampere-turns) it is practical to place the AC coils e.g. 93 on the near side limbs close to the biasing coil 91 as shown in FIG. 6. In this way, the flux density in the limbs immediately underneath the AC coils is substantially the same as that immediately underneath the DC coils. The additional advantage to this technique is that during the fault limiting transient, the flux from the AC coils negates that in the core more effectively. This has a number of benefits; a smaller footprint, less conductor required to bias the core to the level required for effective saturation of the entire core.

In a further modified embodiment, a practical saturated core FCL can also be constructed with only the central limbs in a partial core arrangement. In the partial core embodiment 100, the yokes and outer limbs of each of the steel cores may be eliminated.

Figure 7:
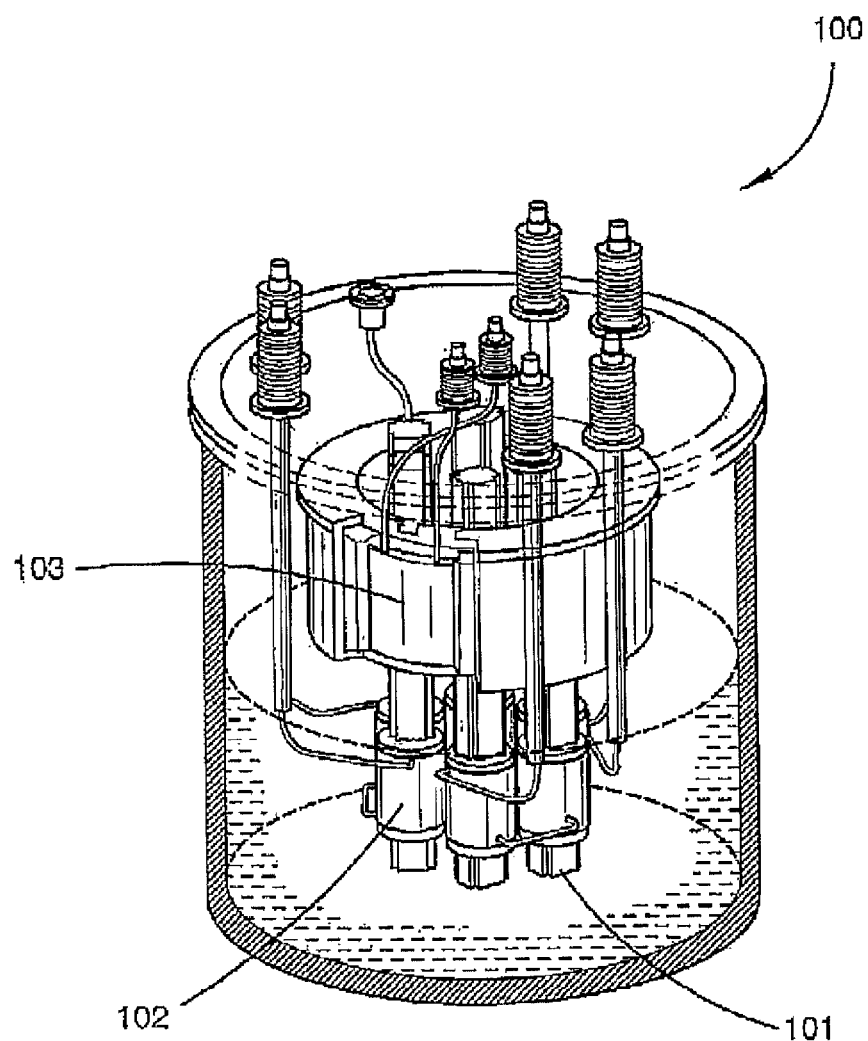
FIG. 7 illustrates a side perspective view of a further modified embodiment including a single elongated steel core for each phase coil.

Turning now to FIG. 7, there is illustrated a further modified embodiment 100 wherein the steel cores e.g. 101 are formed from a single elongated laminated core employing M6 laminations. At one end of each core is formed a high voltage AC phase coil e.g. 102. Each of the six cores pass through the saturating coil which can comprise a DC superconducting coil 103. The superconducting coil 103 holds the cores in saturation.

This further modified embodiment has the added advantage that a lower mass is required by not having the yokes and outer limbs, a lower footprint, and a reduced cost of construction is also provided.

Figure 8:
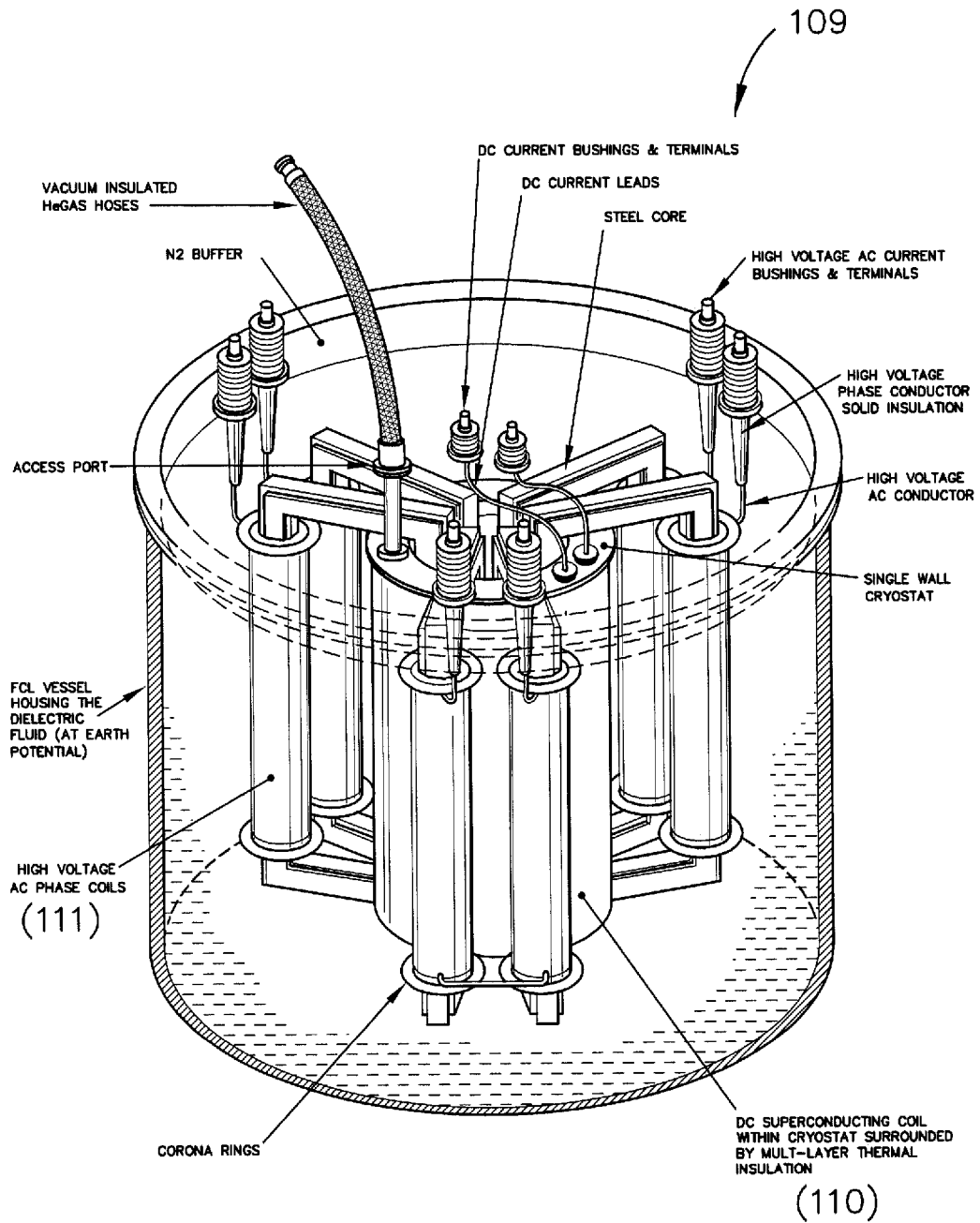
FIG. 8 illustrates a further modified embodiment.

FIG. 8 shows another multi phase embodiment 109 showing a completely immersed DC coil cryostat 110 as well as AC phase coils e.g. 111. In this preferred embodiment the AC coils extend across the greatest length of the DC and AC limb respectively. This ensures that the greatest volume of permeable core material is de-saturated during the fault and can result in better fault clipping performance compared to the case when the AC coils are not extended to the maximum height practically allowable in the core window frame.

The forgoing describes preferred features of the present invention. Modifications, obvious to those skilled in the art can be made thereto without departing from the scope of the invention.

I claim:

1. A fault current limiter, comprising:
a ferromagnetic circuit formed from a ferromagnetic material and including at least a first limb, and a second limb;
a saturation mechanism surrounding the first limb for magnetically saturating the ferromagnetic material of the second limb; and
a phase coil surrounding the second limb, wherein:
the phase coil is immersed in a dielectric fluid; and
the saturation mechanism is not immersed in a dielectric fluid.

2. A fault current limiter as claimed in claim 1, wherein the saturation mechanism comprises a cooled superconducting coil for interconnecting to a DC power supply.

3. A fault current limiter as claimed in claim 2, wherein the superconducting coil is within a cryostat.

4. A fault current limiter as claimed in claim 1, further comprising:
an external vessel housing the ferromagnetic circuit, the saturation mechanism, the phase coil, and the dielectric fluid; and
a series of terminals mounted on the external vessel, wherein the phase coil includes an AC input lead and an AC output lead interconnected to predetermined ones of the terminals.

5. A fault current limiter as claimed in claim 4, further comprising a low temperature cooling supply hose interconnected to the saturation mechanism.

6. A fault current limiter as claimed in claim 1, wherein the limiter is utilised in a multiphase power supply to limit each phase of the supply.

7. A fault current limiter as claimed in claim 6, wherein a single saturation mechanism surrounds the ferromagnetic circuit of each phase of the multiphase power supply.

8. A fault current limiter as claimed in claim 1, wherein:
the ferromagnetic circuit comprises an elongated portion of ferromagnetic material;
a first segment of the elongated portion forms the first limb; and
a second segment of the elongated portion forms the second limb, such that the saturation mechanism and the phase coil are formed around the same elongated portion of ferroelectric material.

9. A fault current limiter as claimed in claim 8, wherein the saturation mechanism is formed around the first segment located at a proximal end of the elongated portion and the phase coil is formed around the second segment located at a distal end of the elongated portion.

10. A fault current limiter as claimed in claim 8, wherein the ferromagnetic circuit comprises a single elongated portion of ferroelectric material.

11. A fault current limiter as claimed in claim 1, wherein the ferromagnetic circuit includes a first, second and third limbs parallel to one another, with portions of the phase coil wound around the first and second limb, with the saturation mechanism wound around the third limb.

12. A fault current limiter as claimed in claim 1, wherein the limiter has a normal operating range of substantially 33 kV to 750 kV.

13. A fault current limiter as claimed in claim 1, wherein the saturation mechanism magnetically saturates the ferromagnetic material of the second limb during non fault conditions.

14. A fault current limiter as claimed in claim 1, wherein the first and second limbs are adjacent one another and the saturation mechanism and the phase coil are of substantially the same size or extent.

15. A fault current limiter as claimed in claim 1, wherein the saturation mechanism is surrounded by a gaseous atmosphere.

16. A fault current limiter, comprising:
a ferromagnetic circuit formed from a ferromagnetic material and including at least a first limb, a second limb; a third limb; a fourth limb;
a saturation mechanism surrounding the first limb for magnetically saturating the ferromagnetic material of the second, third and fourth limbs; and a first phase coil surrounding the second limb; a second phase coil surrounding the third limb and a third phase coil surrounding the fourth limb, wherein:
the phase coils are immersed in a dielectric fluid, and the saturation mechanism is not immersed in a dielectric fluid.

17. A fault current limiter as claimed in claim 16, wherein the saturation mechanism comprises a superconducting coil wound around the first limb within a cryostat.

18. A fault current limiter as claimed in claim 16, wherein the limiter has a normal operating range of substantially 33 kV to 750 kV.

19. A fault current limiter as claimed in claim 16, wherein the saturation mechanism is surrounded by a gaseous atmosphere.

20. A fault current limiter, comprising:
a ferromagnetic circuit formed from a ferromagnetic material and including at least a first limb, and a second limb;
a saturation mechanism surrounding the first limb for magnetically saturating the ferromagnetic material of the second limb, wherein the saturation mechanism includes a superconducting coil within a cryostat; and
at least one phase coil wound around the second limb;
wherein the at least one phase coil is immersed in a dielectric fluid; and
the saturation mechanism is not immersed in the dielectric fluid.

21. A fault current limiter as claimed in claim 20, wherein the first and second limbs are adjacent one another and the saturation mechanism and the phase coil are of substantially the same size or extent.

22. A fault current limiter as claimed in claim 20, wherein the limiter has a normal operating range of substantially 33 kV to 750 kV.

23. A fault current limiter as claimed in claim 20, wherein the saturation mechanism magnetically saturates the ferromagnetic material of the second limb during non fault conditions.

24. A fault current limiter as claimed in claim 20, wherein the saturation mechanism is surrounded by a gaseous atmosphere.

* * * * *